US009873760B2

(12) United States Patent
Killilea et al.

(10) Patent No.: US 9,873,760 B2
(45) Date of Patent: *Jan. 23, 2018

(54) WATER-DISPERSIBLE POLYURETHANE POLYMER

(71) Applicant: Valspar Sourcing, Inc., Minneapolis, MN (US)

(72) Inventors: T Howard Killilea, North Oaks, MN (US); Robert William Springate, Belvidere, IL (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/699,613

(22) Filed: Apr. 29, 2015

(65) Prior Publication Data

US 2015/0307646 A1    Oct. 29, 2015

Related U.S. Application Data

(60) Continuation of application No. 13/902,208, filed on May 24, 2013, now Pat. No. 9,045,666, which is a division of application No. 11/825,026, filed on Jul. 3, 2007, now Pat. No. 8,466,230.

(60) Provisional application No. 60/806,593, filed on Jul. 5, 2006.

(51) Int. Cl.

| C08G 18/42 | (2006.01) |
|---|---|
| C08G 18/71 | (2006.01) |
| C08G 18/08 | (2006.01) |
| C08G 18/12 | (2006.01) |
| C08G 18/34 | (2006.01) |
| C08G 18/66 | (2006.01) |
| C08G 18/68 | (2006.01) |
| C09D 175/14 | (2006.01) |
| C08G 18/32 | (2006.01) |
| C09D 175/06 | (2006.01) |

(52) U.S. Cl.
CPC ............ *C08G 18/71* (2013.01); *C08G 18/08* (2013.01); *C08G 18/0823* (2013.01); *C08G 18/0828* (2013.01); *C08G 18/12* (2013.01); *C08G 18/3203* (2013.01); *C08G 18/34* (2013.01); *C08G 18/348* (2013.01); *C08G 18/423* (2013.01); *C08G 18/4233* (2013.01); *C08G 18/4238* (2013.01); *C08G 18/4288* (2013.01); *C08G 18/6659* (2013.01); *C08G 18/68* (2013.01); *C09D 175/06* (2013.01); *C09D 175/14* (2013.01)

(58) Field of Classification Search
CPC ............ C08G 18/0823; C08G 18/0828; C08G 18/423; C08G 18/4233; C08G 18/4288; C09D 175/14

See application file for complete search history.

(56) References Cited

U.S. PATENT DOCUMENTS

| 4,133,786 | A | 1/1979 | Harris et al. |
|---|---|---|---|
| 4,383,076 | A | 5/1983 | Wolf et al. |
| 4,423,179 | A | 12/1983 | Guagliardo |
| 4,517,322 | A | 5/1985 | Birkmeyer et al. |
| 4,680,346 | A | 7/1987 | Carson et al. |
| 4,720,405 | A | 1/1988 | Carson et al. |
| 4,880,867 | A | 11/1989 | Gobel et al. |
| 5,422,413 | A | 6/1995 | Konig et al. |
| 5,534,310 | A | 7/1996 | Rokowski et al. |
| 5,569,707 | A | 10/1996 | Blum et al. |
| 5,962,571 | A | 10/1999 | Overbeek et al. |
| 5,972,471 | A | 10/1999 | Jasenof et al. |
| 6,001,924 | A * | 12/1999 | Dobert ............... C08F 283/006 427/372.2 |
| 6,239,209 | B1 | 5/2001 | Yang et al. |
| 6,376,589 | B1 | 4/2002 | Tanaka et al. |
| 6,462,127 | B1 | 10/2002 | Ingrisch et al. |
| 6,610,784 | B1 | 8/2003 | Overbeek et al. |
| 6,723,817 | B2 | 4/2004 | Konig et al. |
| 6,827,971 | B2 | 12/2004 | Grenda et al. |
| 6,946,509 | B2 | 9/2005 | He |
| 2003/0130046 | A1 | 7/2003 | Sugiyama et al. |
| 2004/0076758 | A1 | 4/2004 | Lettmann et al. |
| 2005/0143548 | A1 | 6/2005 | Loontjens et al. |
| 2006/0089453 | A1 | 4/2006 | Pajerski |
| 2008/0009601 | A1 | 1/2008 | Killilea et al. |

FOREIGN PATENT DOCUMENTS

| EP | 1217021 | 6/2002 |
|---|---|---|
| WO | WO-93/24551 | 12/1993 |
| WO | 9523818 | 9/1995 |
| WO | 02/28977 | 4/2002 |
| WO | WO-02/31021 | 4/2002 |
| WO | WO0228977 | 4/2002 |
| WO | 2005/016999 | 2/2005 |

OTHER PUBLICATIONS

English translation of Chinese Office Action for corresponding Chinese Application No. 200780025387.4, dated Mar. 23, 2011.
Notice of Allowance for corresponding Canadian Patent Application No. 2,655,722 dated Jun. 18, 2012.
Mexican Office Action dated Aug. 28, 2012 from Mexican Patent Application No. MX/a/2008/016321.
Notice of Grant of a Patent Right for an Invention for corresponding Chinese Patent Application No. 200780025387.4 dated Jun. 1, 2012.
International Search Report and Written Opinion of PCT/US2007/015456 (8 pages).
Office Action from the Patent Office of the People's Republic of China for corresponding Chinese Patent Application No. 200780025387.4, dated Nov. 10, 2011.

\* cited by examiner

*Primary Examiner* — Michael L Leonard
(74) *Attorney, Agent, or Firm* — Hema L. Viswanathan

(57) ABSTRACT

A water-dispersible polyurethane polymer useful in coating applications preferably includes a backbone having urethane linkages and at least one cycloaliphatic group having a closed aliphatic ring structure. Ethylenically unsaturated groups are preferably provided on the polyurethane polymer.

7 Claims, No Drawings

WATER-DISPERSIBLE POLYURETHANE POLYMER

CROSS-REFERENCE TO RELATED APPLICATION(S)

This application is a continuation of and claims priority to U.S. patent application Ser. No. 13/902,208, filed May 24, 2013, which is a divisional of and claims priority to Ser. No. 11/825,026, filed Jul. 3, 2007, which claims priority to U.S. Provisional patent Application No. 60/806,593, filed on Jul. 5, 2006, each of which are entitled "WATER-DISPERSIBLE POLYURETHANE POLYMER", the disclosures of each are incorporated herein by reference in their entirety.

TECHNICAL FIELD

The present invention relates generally to polyurethane polymers and more specifically to water-dispersible polyurethane polymers.

BACKGROUND

Coating compositions including polyurethane (PU) polymers generally exhibit excellent resistance to abrasion, chemicals, and solvents. PU coatings may be used in various applications such as, for example, coatings for wood, concrete, metal, wood, semi-rigid and flexible plastics, rubber, leather, glass fiber sizing, printing inks, and adhesives.

PU coating compositions that exhibit suitable mechanical properties for such applications may be prepared using oil-modified PU polymers. Conventional oil-modified PU polymers are typically prepared in organic solvents and applied in clear or pigmented coatings. After application of a PU coating composition to a substrate, the organic solvent is evaporated off to form a film that is then typically cured by air oxidation of ethylenic groups included in the PU polymers of the film.

Governments have increasingly established regulations restricting the release of volatile organic compounds (VOCs) into the atmosphere, which impact the use of PU coating compositions containing oil-modified PU polymers. To reduce the amount of released VOCs, manufacturers have been reducing the amount of organic solvent in PU coating compositions through use of water-dispersible PU polymers. Conventional water-dispersible PU polymers may be produced, for example, by reacting polyols and dihydroxy carboxylic acid compounds with an excess of diisocyanate to provide a carboxy-functional prepolymer having isocyanate (NCO) terminal groups. The acid groups may be neutralized to provide a neutralized prepolymer that is dispersible in water, which may be further modified to elicit various properties.

PU films formed using conventional water-dispersible PU polymers typically vary from films that are hard and relatively inflexible to films that are soft and highly flexible. It is often difficult to prepare a PU film that exhibits a proper blend of performance characteristics (e.g., both good hardness and flexibility) from conventional water-dispersible PU polymers. To achieve both good hardness and flexibility using conventional water-dispersible PU polymers, manufacturers typically formulate the PU polymers using increased amounts of isocyanate, which may result in increased material costs that are prohibitive for various applications.

As such, there is a continuing need for new low VOC or substantially VOC-free PU coating systems.

SUMMARY

In one embodiment, the present invention provides a water-dispersible PU polymer that includes a plurality of urethane linkages, a plurality of salt or salt-forming groups, a plurality of air-curable ethylenically unsaturated groups, and a plurality of cycloaliphatic groups having the structure X—Z—X, where Z is an aliphatic ring structure, each X is a group independently selected from an ester group, an ether group, an amide group, a carbonate group, hydrogen, or $CR_n$, where R is independently selected from hydrogen, a halogen, oxygen, nitrogen, an organic group, or a combination thereof and n is 0, 1 or 2, and where at least one of the X groups is a divalent linkage group that attaches the cycloaliphatic group to another portion of the polyurethane polymer. Preferably, the PU polymer includes at least about 30 weight percent of the cycloaliphatic groups and the air-curable ethylenically unsaturated groups, based on the total dry weight of the PU polymer.

In another embodiment, the present invention provides a coating composition including the PU polymer described herein and an aqueous carrier.

In yet another embodiment, the present invention provides a method for forming a PU prepolymer useful for producing the PU polymer of the present invention. The PU prepolymer may be neutralized, dispersed in an aqueous carrier, and optionally chain extended.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Definitions

Unless otherwise specified, the following terms used in this specification have the meanings provided below.

The term "cycloaliphatic" refers to an organic compound or group containing a saturated or unsaturated non-aromatic closed ring structure.

The term "dry weight" as used herein in the context of a prepolymer or polymer refers to the total weight of the reactants (not including any solvents) for forming the PU prepolymer or polymer.

The term "isocyanate" refers to organic compounds having at least one isocyanate, or —NCO, group. Unless indicated otherwise, the term includes both isocyanates and polyisocyanates (e.g., diisocyanates, triisocyanates, etc.).

The term "prepolymer" refers to an intermediate polymer stage formed during production of a PU polymer.

The term "organic hydroxyl group" refers to a functional group having a hydroxyl group covalently bonded to a carbon atom, and excludes hydroxyl groups present in carboxylic-functional groups.

The term "water-dispersible" used in the context of a prepolymer (or polymer) means that (1) the prepolymer is itself capable of being dispersed into an aqueous carrier such as, for example, water (e.g., without requiring the use of a separate surfactant) or (2) an aqueous carrier can be added to the polymer to form a stable dispersion (i.e., the dispersion should have at least one month shelf stability at normal storage temperatures). Such water-dispersible polymers can include nonionic or anionic functionality on the polymer, which assist in rendering them water-dispersible. For such polymers, external acids or bases are typically required for anionic stabilization; however, these are not considered secondary emulsifying agents (e.g., surfactants).

A group that may be the same or different is referred to as being "independently" something. Substitution is anticipated on the organic groups of the compounds of the present invention. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, for example, "alkyl group" includes ether groups, haloalkyls, nitroalkyls, carboxyalkyls, hydroxyalkyls, sulfoalkyls, etc.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" amine can be interpreted to mean that the coating composition includes "one or more" amines.

DETAILED DESCRIPTION

The present invention provides a polyurethane (PU) polymer for use in coating applications. Preferred PU polymers of the present invention include urethane linkages, cycloaliphatic groups, air-curable ethylenically unsaturated groups, and salt groups. If desired, the PU polymer may be formed via a water-dispersible PU prepolymer intermediate that may be optionally combined with an aqueous carrier to form a dispersion useful in coating applications. The dispersed PU prepolymer may be optionally chain-extended (or otherwise modified or processed) to form a PU polymer useful in coating compositions.

The PU polymer of the present invention may be included in PU dispersions (or coating compositions) for use in a variety of coating applications such as, for example, coatings for wood, concrete, metal, semi-rigid and flexible plastics, rubber, leather, glass fiber sizing, printing inks, and adhesives. Due to its water-dispersibility, the PU polymer of the present invention may be useful in coating applications requiring low or substantially zero VOC levels. Some embodiments of the PU polymer are particularly suited for one-component applications in wood flooring where excellent toughness, chemical and water resistance, and rapid dry times may be required.

As discussed above, to achieve both good hardness and flexibility using conventional water-dispersible PU polymers, manufacturers typically formulate the PU polymers using increased amounts of isocyanate. In some embodiments, PU films prepared using the water-dispersible PU polymer of the present invention exhibit both suitable hardness and flexibility without requiring the use of increased isocyanate levels, which may result in enhanced cost efficiency. In addition, PU films prepared using the water-dispersible PU polymer of the present invention may exhibit enhanced physical properties relative to PU films prepared using conventional water-dispersible PU polymers. While not wishing to be bound by theory, the cycloaliphatic groups of the PU polymer may enhance the physical properties of PU films through mobility of the ring structure, especially when the cycloaliphatic groups are located in a backbone of the PU polymer.

Any suitable cycloaliphatic group may be included in the PU polymer. Examples of suitable cycloaliphatic groups for incorporation in the PU polymer include groups having the structure X—Z—X, where Z is an aliphatic ring structure and each X is a group independently selected from ester groups, ether groups, amide groups, carbonate groups, hydrogen, or $CR_n$, where n is 0, 1 or 2 and R is independently selected from hydrogen, a halogen, oxygen, nitrogen, an organic group, and combinations thereof (i.e., when n=2, the two R's may be the same or different). One or both of the X groups preferably are linkage groups that attach the cycloaliphatic groups to other portions of the PU polymer.

The structure Z may be any type and/or size of suitable closed aliphatic ring structure. For example, Z may be a 3-member organic ring, a 4-member organic ring, a 5-member organic ring, a 6-member organic ring, or any other organic non-aromatic aliphatic ring structure having 7 or more ring members. As used herein the term "n-member ring" (and variants thereof), where n is an integer, refers to the number n of atoms making up the ring. In presently preferred embodiments, Z is a six-member organic ring structure. Examples of preferred six-member organic ring structures for Z include cyclohexane groups, cyclohexene groups, cyclohexadiene groups, and variants thereof. In a preferred embodiment, Z is a cyclohexane group having the X groups covalently attached at the 1,2; 1,3; or 1,4 positions of the hexane ring.

Cycloaliphatic groups may be incorporated into the PU polymer via any cycloaliphatic-group-containing compound (or combination of compounds). As used herein, the term "cycloaliphatic-group-containing compound" refers to compounds including one or more cycloaliphatic groups of the above X—Z—X structure, compounds including one or more cycloaliphatic groups of structures other than the X—Z—X structure, and compounds including both one or more cycloaliphatic groups of the X—Z—X structure and one or more cycloaliphatic groups of structures other than the X—Z—X structure. As used herein, when cycloaliphatic-group-containing compounds used to make the PU polymer are referred to as containing the X—Z—X structure, this refers to compounds that include (1) the entire X—Z—X structure or (2) the Z group and either (i) at least a portion of the X groups or (ii) a precursor group used to form at least a portion of the X groups, or (iii) a combination of (i) and (ii).

Examples of suitable cycloaliphatic-group-containing compounds include cycloaliphatic polyols, cycloaliphatic polycarboxylic acids, cycloaliphatic polyesters, cycloaliphatic polyamides, cycloaliphatic alkyd compounds, and combinations thereof. Preferably, at least a substantial portion (and in some embodiments all) of the cycloaliphatic groups are provided through compounds including the X—Z—X structure. In some embodiments, some or all of the cycloaliphatic groups may be incorporated into the PU polymer via cycloaliphatic alkyds and/or cycloaliphatic polyesters formed from reactants including cycloaliphatic polycarboxylic acids and cycloaliphatic polyols. In a preferred embodiment, the cycloaliphatic group is formed from a 1,4 cyclohexane diacid and/or a compound containing a 1,4 cyclohexane diacid.

The PU polymer may include one or more cycloaliphatic groups incorporated into the PU polymer through an isocyanate compound containing a cycloaliphatic group. In such embodiments, the PU polymer preferably contains cycloaliphatic groups incorporated through both cycloaliphatic isocyanate and non-isocyanate compounds (e.g., compounds having the above X—Z—X structure).

Preferably, the cycloaliphatic groups having the X—Z—X structure are incorporated into a backbone of the PU polymer such that each cycloaliphatic group is attached to the backbone through one or both of the X groups, thereby forming a segment of the backbone. In such embodiments, the cycloaliphatic groups may be segments located at a terminal end of the backbone, intermediate segments located at an intermediate location of the backbone, or combinations thereof. In some embodiments, Z is a divalent cycolaliphatic ring structure and each X is a linkage group that attaches Z (and thus the cycloaliphatic group) to other portions of the PU polymer. In some embodiments (e.g., where one of the X groups is hydrogen), the X—Z—X structure may be located at a terminal end of the PU polymer backbone.

The amount of cycloaliphatic groups in the PU polymer may vary depending on the desired film or coating properties. Preferably, the amount of cycloaliphatic groups in the PU polymer is optimized so that films formed from coating compositions containing the PU polymer exhibit both suitable levels of flexibility and hardness for the desired coating applications. As discussed above, preferably at least a substantial portion (and in some embodiments all) of the cycloaliphatic groups of the PU polymer is provided by compounds containing the X—Z—X structure. In some embodiments, the PU polymer includes at least about 3, preferably at least about 4, and more preferably at least about 5 weight percent of cycloaliphatic-groups-containing containing the X—Z—X structure, based on the dry weight of the PU polymer. In some embodiments, the PU polymer includes less than about 20, preferably less than about 16, and more preferably less than about 12 weight percent of cycloaliphatic groups containing the X—Z—X structure, based on the dry weight of the PU polymer.

A variety of isocyanates may be used to form the urethane linkages contained in the PU polymer. In the embodiments in which the PU polymer is formed with PU prepolymers, the isocyantes may form terminal or pendant isocyanate groups in the PU prepolymers, which may then be reacted to form the urethane linkages. Suitable isocyanates include aliphatic, cycloaliphatic, araliphatic or aromatic isocyanates, diisocyanates, triisocyanates, or other polyisocyanates. Examples of suitable diisocyanates include 1,2-ethylene diisocyanate, 1,4-tetramethylene diisocyanate, 1,6-hexamethylene diisocyanate, 2,2,4-trimethyl-1,6-hexmethylene diisocyanate, 2,4,4-trimethyl-1,6-hexmethylene diisocyanate, 1,12-dodecane diisocyanate, cyclobutane 1,3-diisocyanate, cyclohexane 1,3-diisocyanate, cyclohexane-1,4-diisocyanate, bis(4isocyanatocyclohexyl)-methane (Des W), 1-methylcyclohexane-2,2-diisocyanate, 1-methylcyclohexane-2,6-diisocyanate, 3-isocyanatomethyl-3,5,5-trimethyl-cyclohexyl isocyanate (isophorone diisocyanate, IPDI), 2,5-bis(isocyanatomethyl)-8-methyl-1,4,-methano-decahydronaphthalene, 3,5-bis(isocyanatomethyl)-8-methyl-1,4,-methanodecahydronaphthalene, 2,6-bis-(isocyanato)-4,7-methano-hexahydroindane, dicyclohexyl 2,4'-diisocyanate, dicyclohexyl 4,4'-diisocyanate, 2,6-hexahydrotolylene diisocyanate, 2,6-hexahydro-tolylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 4,4'-biphenyl diisocyanate, 4,4'-diisocyanato-3,3'-dimethoxybiphenyl, 4,4'-diisocyanato-3,3'-dimethylbiphenyl, 3,3'-dipenylbiphenyl-4, 4'-diisocyanate, 2,4'-diphenylmethane diisocyanate, 4,4'-diphenylmethane diisocyanate (MDI), naphthylene 1,5-diisocyanate, toluene diisocyanates (TDI), such as, for example, 2,4-toluene diisocyanate, 2,6-toluene diisocyanate, N,N'-(4,4'-dimethyl-3,3'-diisocyanato-diphenyl)uretdione, m-xylylene diisocyanate, tetramethylxylylene diisocyanate, and the like; or triisocyanates, such as, for example, 2,4,4'-triisocyanatodiphenyl ether, 4,4',4"-triisocyanatotriphenyl-methane, tris(4-isocyanatophenyl)thiophosphate, and the like; polyisocyanates (isocyanurates) based on 1,6-hexamethylene diisocyanate such as, for example, 1,3,5-tris-(6-isocyanato-hexyl)-[1,3,5]triazinane-2,4,6-trione (Desmodur N-3300) and 1,3-bis-(6-isocyanato-hexyl)-1-[(6-isocyanato-hexylamino)-oxomethyl]-urea (Desmodur N-75); or mixtures thereof. More preferred isocyanates include toluene diisocyanates such as, for example, 2,4-toluene diisocyanate, and 2,6-toluene diisocyanate, 1,6-hexamethylene diisocyanate, 2,4'-disocyanato-diphenylmethane, 4,4'-disocyanato-diphenylmethane, 4,4'-diphenylmethane diisocyanate (MDI), 3-isocyanato-methyl-3,5,5-trimethyl-cyclohexyl isocyanate (IPDI), bis(4 isocyanatocyclo-hexyl)-methane (Des W), dicyclohexyl 2,4'-diisocyanate, dicyclohexyl 4,4'-diisocyanate; or mixtures thereof. Most preferred isocyanates are 2,4-toluene diisocyanate, and 2,6-toluene diisocyanate, 1,6-hexamethylene diisocyanate, 2,4'-disocyanato-diphenylmethane, 4,4'-disocyanato-diphenylmethane, 4,4'-diphenylmethane diisocyanate (MDI), 3-isocyanatomethyl-3,5,5-trimethyl-cyclohexyl isocyanate (IPDI), bis (4isocyanatocyclohexyl)-methane (Des W), or mixtures thereof.

In some embodiments, the PU polymer preferably includes a plurality of urethane linkages arising from at least about 15, more preferably at least about 25, and even more preferably at least about 30 weight percent isocyanates, based on the dry weight of the PU polymer. In some embodiments, the PU polymer includes a plurality of urethane linkages arising from preferably less than about 55, more preferably less than about 50, and even more preferably less than about 45 weight percent isocyanates, based on the dry weight of the PU polymer. In addition to urethane linkages, the PU polymer may contain any other suitable linkage group (e.g., ester groups, ether groups, urea groups, amide groups, carbonate groups, and combinations thereof).

Preferably at least one of the reactants for forming the PU polymer includes one or more air-curable ethylenically-unsaturated groups to facilitate air-induced curing of coating compositions including the PU polymer. Such ethylenic unsaturation may be introduced into the PU polymer, for example, through incorporation of an ester polyol, a hydroxy-functional oil or fatty acid containing autooxidative carbon-carbon double bonds, alkyd-based polyols, fatty amines, or any other suitable reactant. The degree of saturation or unsaturation of the PU polymer may be tailored to facilitate crosslinking of coating compositions for various applications.

The PU polymer preferably contains at least about 5, more preferably at least about 15, even more preferably at least about 20, and most preferably at least about 25 weight percent of ethylenically-unsaturated groups, based on the dry weight of the PU polymer. In some of these embodiments, the PU polymer may contain less than about 65, preferably less than about 55, and more preferably less than about 50 weight percent of ethylenically-unsaturated groups, based on the dry weight of the PU polymer.

The cycloaliphatic groups and the air-curable ethylenically unsaturated groups preferably constitute at least about 30 weight percent and more preferably at least about 25 weight percent of the PU polymer, based on the dry weight of the PU polymer. While not wishing to be bound by theory, it is believed that these concentrations allow the resulting coating to exhibit good balance of flexibility and hardness, good adhesion to a substrate, and good chemical resistance. In some of these embodiments, the PU polymer preferably includes at least about 4 weight percent of the cycloaliphatic groups and at least about 15 weight percent of the air-curable ethylenically unsaturated groups.

In some embodiments, one or both of the cycloaliphatic groups and the air-curable ethylenically unsaturated groups may be provided in one or more alkyd-based polyols. In these embodiments, the PU polymer preferably contains at least about 20, more preferably at least about 30, and even more preferably at least about 35 weight percent of groups formed from alkyd-based polyols, based on the dry weight of the PU polymer. In some of these embodiments, the PU polymer preferably contains less than about 65, more preferably less than about 55, and even more preferably less than about 50 weight percent of groups formed from alkyd-based polyols, based on the dry weight of the PU polymer.

Alkyd-based polyols (or hydroxy-functional alkyds) can be prepared using any suitable method, and may or may not contain sulfonate functionality. Processes for producing alkyds from conventional oils are known in the art. See, for example, U.S. Pat. Nos. 4,133,786, 4,517,322, and 6,946,509. An example of a method to prepare an alkyd could include the alcoholysis of an oil and polyol with a further reaction with polybasic acids and, optionally, further polyols. In addition, polybasic acids and fatty acids may be reacted with polyols in suitable proportions to prepare the alkyds. In a preferred embodiment, ethylenically unsaturated groups are incorporated into the PU polymer through a cycloaliphatic-based alkyd polyol compound containing at least one ethylenically unsaturated group. Monoglycerides and diglycerides may also be utilized in place of, or in addition to, the hydroxy functional alkyd. Suitable monoglycerides and diglycerides can be readily synthesized using conventional techniques. Polyols synthesized via the reaction of at least one fatty acid and a polyol may also be employed to provide ethylenic unsaturation.

Examples of suitable oils and/or fatty acids derived therefrom useful in producing alkyds include compounds such as, for example, linseed oil, safflower oil, tall oil, cotton seed oil, ground nut oil, tung oil, wood oil, ricinene oil, sunflower oil, soya oil, castor oil, dehydrated castor oil and the like. Examples of suitable fatty acids include soya fatty acids, linseed fatty acids, dehydrated castor fatty acids, linolenic fatty acids, ricinoleic fatty acids, and linoleic fatty acids. These oils or fatty acids can be used alone or as a mixture of one or more of the oils or fatty acids.

Examples of suitable polyols for use in forming alkyds include difunctional alcohols, trifunctional alcohols (e.g., glycerine, trimethylol propane, trimethylol ethane, trimethylol butane, tris hydroxyethyl isocyanurate, etc.), tetrahydric or higher alcohols (e.g., pentaerythritol, diglycerol, etc.), and combinations thereof. Examples of suitable diols include neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethylhexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, and combinations thereof. Preferred polyols include glycerol, trimethylolpropane, neopentyl glycol, diethylene glycol, pentaerythritol, and combinations thereof.

The PU polymer also preferably includes one or more groups derived from aliphatic, cycloaliphatic, or aromatic polycarboxylic acids. As used herein, the term "polycarboxylic acid" includes both polycarboxylic acids and anhydrides thereof. Examples of suitable polycarboxylic acids include compounds such as, for example, aliphatic, cycloaliphatic saturated or unsaturated and/or aromatic polybasic carboxylic acids, such as, for example, dicarboxylic, tricarboxylic and tetracarboxylic acids. Specific examples of suitable polycarboxylic acids include phthalic acid, isophthalic acid, adipic acid, terephthalic acid, tetrahydrophthalic acid, naphthalene dicarboxylic acid, hexahydrophthalic acid, endomethylenetetrahydrophthalic acid, succinic acid, glutaric acid, sebacic acid, azelaic acid, trimellitic acid, pyromellitic acid, fumaric acid, maleic acid, 1,4 cyclohexane diacid, hydrogenated phthalic anhydride, and anhydrides and combinations thereof.

In some embodiments, polyols such as polyether polyols, polyester polyols, polyurea polyols, polyamide polyols, polycarbonate polyols, and combinations thereof may be included in the PU polymer. In some embodiments, these compounds may include as constituents the polyols and/or polycarboxylic acids described above in regards to alkyd formation.

The PU polymer preferably contains a suitable amount of salt-containing and/or salt-forming groups to facilitate preparation of a PU dispersion with an aqueous carrier. Examples of suitable salt-forming groups include neutralizable groups (e.g., acidic or basic groups). At least a portion of the salt-forming groups may be neutralized to form salt groups useful for dispersing the PU polymer into an aqueous carrier. Acidic or basic salt-forming groups may be introduced into the PU polymer by any suitable method. One or more compounds containing an active hydrogen group and active acid or base group may be included as reactants for forming the PU polymer. Examples of suitable compounds having active hydrogen and acid groups include hydroxy and mercapto carboxylic acids, aminocarboxylic acids, aminohydroxy carboxylic acids, sulfonic acids, hydroxy sulfonic acids, aminosulfonic acids, and combinations thereof. Examples of suitable compounds having active hydrogen and basic groups include aliphatic, cycloaliphatic and heterocyclic amino alcohols, diols and triols, amines, diamines, triamines, tetramines, amides, and combinations thereof.

For example, PU polymers can be made water-dispersible by incorporating amine or acid functionality into the PU polymers. For example, water-based anionically stabilized PU polymers can be prepared by reacting polyols and dihydroxy carboxylic acid compounds (e.g., dimethylol propionic acid and/or dimethylol butanoic acid) with an excess of diisocyanate to provide a carboxylic acid functional polymer having NCO terminal groups. The acid groups can be neutralized with tertiary amines to provide salt groups. The resulting neutralized polymer can be readily dispersed in water. Alternatively, the anionic stabilizing group of the water-dispersible PU polymers can be replaced with cationic stabilizing groups or non-ionic stabilizing groups, to facilitate water dispersibility.

Any acid or base may be used to neutralize the acidic or basic salt-forming groups and form salt groups. Examples of suitable neutralizing bases include inorganic bases such as sodium hydroxide, potassium hydroxide, lithium hydroxide, ammonia, triethylamine, dimethyl ethanol amine, and combinations thereof. Examples of suitable neutralizing acids include organic acids such as formic acid and acetic acid, inorganic acids such as hydrochloric acid and sulfuric acid, and combinations thereof.

In some embodiments, inclusion of a salt-containing group may enable the PU prepolymer to be suitably dispersed in an aqueous carrier without requiring a neutralization step. Examples of suitable salt-containing groups include sulfonate groups present in the form of alkali metal salts (e.g., lithium, sodium, potassium, etc.); sulfonate groups present in the form of ammonium, tertiary amine, copper, or iron salts; and combinations thereof. Examples of preferred monomers having sulfonate groups that may be incorporated into the PU polymer include, 5-(sodiosulfo) isophthalic acid (SSIPA), 5-(lithiosulfo)isophthalic acid (LSIPA) and the like. Non-sulfonate salt-containing groups may also be employed in addition to, or in place of, sulfonate groups.

The water-dispersible PU polymer may be formed using techniques and equipment that will be familiar to persons skilled in the art. For example, in the embodiments in which the PU polymers are formed with PU prepolymers, the PU prepolymers may be dispersed into an aqueous carrier and chain extended (or otherwise modified) to obtain higher molecular weight PU polymers. Extension of the PU prepolymers may be achieved by reaction of the neutralized water-dispersed PU prepolymers with one or more chain extenders. This may occur, for example, by reacting one or more chain extenders with terminal or pendant isocyanate(s) present on the PU prepolymer. Examples of suitable chain extenders include alkyl amino alcohols, cycloalkyl amino alcohols, heterocyclic amino alcohols, polyamines (e.g., ethylene diamine, diethylene triamine, triethylene tetra amine, melamine, etc.), hydrazine, substituted hydrazine, hydrazide, amides, amides, water, other suitable compounds having active hydrogen groups, and combinations thereof.

The above-discussed suitable dry weight concentrations of the compounds in the PU polymer may be obtained by combined comparable concentrations of the reaction components to form the PU prepolymer and/or polymer. For example, the PU polymer may contain at least about 4 weight percent of cycloaliphatic groups (based on the dry weight of the PU polymer) by including at least about 4 weight percent of the cycloaliphatic-group-containing compound in the reaction components, based on the dry weight of the reaction components. Similarly, the PU polymer may contain at least about 15 weight percent of ethylenically-unsaturated groups (based on the dry weight of the PU polymer) by including at least about 15 weight percent of the ethylenically-unsaturated compound in the reaction components, based on the dry weight of the reaction components. As understood by persons skilled in the art, the concentrations of the compounds in the resulting PU polymer may be less than the concentrations in the reaction components (e.g., within a few weight percent) due to partial reaction conversions, by-product formations, and the like.

The molecular weight of PU polymers of the present invention may vary widely and may be tailored for particular applications. In some embodiments, the PU polymers preferably have peak molecular weights (Mp) of at least about 3,000, more preferably at least about 5,000, and even more preferably at least about 10,000. In some embodiments, the PU polymers preferably have Mp of less than about 150,000, more preferably less than about 120,000, and even more preferably less than about 100,000. Mp of a PU polymer, as defined herein, is the peak value obtained from a molecular weight distribution plot, which has weight fraction on ordinate (Y-axis) and specific molecular weight on abscissa (X-axis). Weight fraction is defined as a ratio of PU polymer of a specific molecular weight in a PU polymer sample to the total weight of the sample. For further discussion of Mp and methods for determining MP, see U.S. Pat. No. 5,534,310 Rokowski et al.

In some embodiments, the PU polymers preferably have number average molecular weights (Mn) of at least about 1,000, more preferably at least about 1,500, and even more preferably at least about 2,000. In some embodiments, the PU polymers preferably have Mn of less than about 150,000, more preferably less than about 120,000, and even more preferably less than about 100,000.

The ratio of cycloaliphatic groups included in the PU polymer relative to the isocyanate units (or urethane linkages) included in the PU polymer may vary to produce the desired result. The PU polymer preferably includes less than about 8, more preferably less than about 7, even more preferably less than about 6, and most preferably less than about 5 isocyanate units per 1 cycloaliphatic group having the X—Z—X structure. Moreover, the PU polymer preferably includes at least about 1, more preferably at least about 2, and even more preferably at least about 3 isocyanate units per 1 cycloaliphatic group having the X—Z—X structure described above.

PU polymers of the present invention may exhibit any suitable acid number. Acid numbers are typically expressed as milligrams of KOH required to titrate a sample to a specified end point. Methods for determining acid numbers are well known in the art. See, for example, ASTM D 974-04 entitled "Standard Test Method for Acid and Base Number by Color-Indicator Titration" and available from the American Society for Testing and Materials International of West Conshohocken, Pa. In some embodiments, the PU polymer may have an acid number of at least about 2, and more preferably at least about 5. In some embodiments, the PU polymer may have an acid number of less than about 40, and more preferably less than about 30.

The PU polymer dispersion may be combined with additional additives and solvents to form a coating composition. Such coating compositions may be formed using techniques and compositional ingredients that will be familiar to persons skilled in the art.

Coating compositions of the present invention may contain one or more pigments. Suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, and/or organic yellows (such as Hansa yellow), and combinations thereof.

Coating compositions (or dispersions) of the present invention may include driers. Typical driers include, for example, metal salts of cobalt, manganese, lead, zirconium, calcium, cerium, lanthanum, neodymium salts, and combinations thereof. In some embodiments, metal driers may be used in combination with accelerators such as, for example, 1,10 phenanthroline, bipyridine, and the like.

PU coating compositions of the present invention can also include other ingredients such as plasticizers, colorants, dyes, surfactants, thickeners, heat stabilizers, leveling agents, anti-cratering agents, fillers, sedimentation inhibitors, ultraviolet-light absorbers, and the like to modify properties. Additives such as heat stabilizers, ultraviolet-light absorbers, etc., can be dispersed in the reaction mixture and become an integral part of the urethane polymer. Alternatively, the additives may be added after the water-dispersible PU compositions (or dispersions) have been formed.

In some embodiments, PU coating compositions or dispersions of the present invention preferably include less than about 30, more preferably less than about 20, and even more preferably less than about 10 weight percent VOCs, based on the total weight of the coating composition or dispersion.

A suitable polyurethane dispersion of the present invention may be made by combining 32 to 50 parts of isocyanate, 35 to 55 parts of alkyd polyol containing the X—Z—X structure, and 4 to 12 parts of aliphatic dicarboxylic acid in a reactor. The choice of which isocyanate, alkyd polyol, and dicarboxylic acid to use and in what specific amount may be determined based on the desired end use. If desired, 0 to 30 parts other additives may be introduced. The reactants are reacted under a nitrogen blanket in the presence of a suitable amount of n-methylpyrollidone. The mixture is heated to 80° C. whereupon 200 parts-per-million (ppm) dibutyl tin dilaurate is added and the reaction is processed until the isocyanate level of the mixture is below about 5% as determined by titration with hydrochloric acid.

The concentrations of the isocyanate and the alkyd polyol preferably provide excess amounts of isocyanate groups relative to the organic hydroxyl groups of the alkyd polyol. In some embodiments, the reaction components preferably include about 3 equivalents of isocyanate or less, more preferably about 2.5 equivalents of isocyanate or less, and most preferably about 2 equivalents of isocyanate or less per 1 equivalent of organic hydroxyl group. In some of these embodiments, the reaction components preferably includes at least about 1.2 equivalents of isocyanate, more preferably at least about 1.4 equivalents of isocyanate, and even more preferably at least about 1.5 equivalents of isocyanate or less per 1 equivalent of organic hydroxyl group. This desirably reduces the amount of remaining organic hydroxyl groups in the resulting PU prepolymer after the reaction. In some of these embodiments, the PU prepolymer is at least substantially free of organic hydroxyl groups after the reaction. Accordingly, the resulting PU prepolymer preferably includes at least about one terminal or pendant isocyanate group, and more preferably includes at least about two isocyanate groups as terminal and/or pendant groups.

The resulting PU prepolymer is then cooled to about 65° C. and a suitable amount of triethylamine is added to form salts groups on the PU prepolymer. The PU prepolymer is then dispersed into 50° C. deionized water and is subsequently chain extended using 2 to 6 parts of polyamine chain extender. 35 ppm manganese drier is then added and the dispersion is reduced to 33% solids by weight with water. In some embodiments, the salts groups may be formed on the PU prepolymer for neutralization prior to the chain extending to form the PU polymer. In other embodiments, the PU prepolymer may be chain extended to form the PU polymer prior to the formation of the salt groups for neutralization. Additionally, one or more portions of the salt formation/neutralization reaction may coincide with the chain extending reaction.

The above alkyd polyol may be formed from 10-25 parts cycloaliphatic-containing compound of the X—Z—X structure, 40-70 parts fatty acids or oil, and 10-40 parts dicarboxylic acid and/or polyol. The choice of which cycloaliphatic-containing compound of the X—Z—X structure, which fatty acids or oil, and which dicarboxylic acid and/or polyol to use and in what specific amount may be determined based on the desired end use. The reaction mixture is slowly heated to 230° C. and stirred as water is removed. The mixture is heated and tested until a test sample has an acid number of less than 2 mg of KOH/gram. Once the acid number is less than 10 mg of KOH/gram, a suitable amount xylene is added and the mixture processed under reflux. The xylene is stripped to less than about 1%.

Thus, as described above, the present invention provides a water-dispersible PU polymer that includes at least one cycloaliphatic group of the X—Z—X structure located preferably in a backbone of the PU polymer. Relative to films formed using conventional water-dispersible PU polymers, films formed using water-dispersible PU polymers of the present invention may (1) exhibit comparable or enhanced properties such as hardness and flexibility and/or (2) utilize reduced amounts of isocyanate.

EXAMPLES

The present invention is more particularly described in the following examples that are intended as an illustration only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

A PU dispersion was prepared by combining a dihydroxy carboxylic acid compound (dimethylol propionic acid), a polyester compound (neopentyl glycol/adipic acid), an isocyanate compound (Desmodur W), an alkyd-based polyol, and n-methylpyrollidone solvent. The alkyd-based polyol was derived from a cyclohexane compound (cyclohexane dicarboxylic acid) (having a structure X—Z—X), an ethylenically-unsaturated fatty acid compound (soya fatty acids), and a tri-functional polyol (trimethylol propane). The isocyanate compound was provided in an excess amount relative to the isocyanate-reactive hydroxyl groups. Table 1 lists the relative concentrations of the reaction components, based on the dry weight of the reaction components.

TABLE 1

| Component | Percent by weight |
| --- | --- |
| Dihydroxycarboxylic acid | 6.0 |
| Alkyd-based polyol | 45.7 |
| Polyester | 8.0 |
| Isocyanate | 40.3 |

The reaction components were heated to 80° C. whereupon dibutyl tin dilaurate was added and the reaction was processed until substantially all of the isocyanate-reactive hydroxyl groups were reacted with the isocyanate compounds. The resulting PU prepolymer mixture was then cooled to about 65° C., thereby providing prepolymers having cyclohexane groups, ethylenically-unsaturated groups, carboxylic acid salt-forming groups, and terminal and/or pendant isocyanate groups. Because an excess amount of the isocyanate compound was used, the resulting prepolymers were substantially free of isocyanate-reactive hydroxyl groups.

Triethylamine was then added to react with the carboxylic acid groups to form salts groups on the PU prepolymers. The PU prepolymers were then dispersed into chilled deionized water, and reacted with ethylenediamine to chain extend the PU prepolymers to form the PU polymer having urethane linkages. Manganese drier was then added, and the PU polymer dispersion was adjusted to 33% solids.

The PU polymer dispersion was subsequently coated onto a substrate, and dried. The drying caused the ethylenically-unsaturated groups of the PU polymer to crosslink, thereby strengthening the resulting coating. The combined concentrations of the cyclohexane groups (about 7 weight percent) and the ethylenically-unsaturated fatty acid groups (about 26 weight percent) in the PU polymer was greater than 30% by weight of the PU polymer, based on a dry weight of the PU polymer. As discussed above, this allowed the resulting coating to exhibit good balance of flexibility and hardness, good adhesion to the substrate, and good chemical resistance.

Coatings prepared with the PU polymer dispersion of Example 1 were then compared to the oil-modified urethane coatings of Comparative Examples A-C, where Comparative Example A was a coating commercially available under the trade designation "OLYMPIC" (product number 43884) from PPG Architectural Finishes, Inc., Pittsburgh, Pa.; Comparative Example B was a coating commercially available under the trade designation "MINWAX" (product number 71028) from Minwax Company, Upper Saddle River, N.J.; and Comparative Example C was a coating commercially available under the trade designation "RUST-OLEUM" (product number 130001) from Rust-Oleum Corporation, Vernon Hills, Ill. Table 2 lists the concentrations of VOCs, the dry set-to-touch (STT) times, the dry tack-free (TF) times, and the dry through-dry (TD) times for the coatings of Example 1 and Comparative Examples A-C.

TABLE 2

| Examples | VOCs (grams/liter) | Dry STT | Dry TF | Dry TD |
| --- | --- | --- | --- | --- |
| Example 1 | 212 | <25 minutes | <35 minutes | 1.5 hours |
| Comparative Example A | 444 | 1.25 hours | 5.5 hours | 6.5 hours |
| Comparative Example B | 451 | 45 minutes | 3.25 hours | 4.5 hours |
| Comparative Example C | 513 | 1 hour | 2.25 hours | 4.5 hours |

Dry times were determined on films applied by brush or pad to about 38 dry micrometers (about 1.5 dry mils) to about 51 dry micrometers (about 2.0 dry mils), on lacquer charts (Leneta Co. Form 8B) by both finger method and Gardner Drytime Recorder (Model DG-9602). As shown, the coating of Example 1 contained a low concentration of VOCs, and was capable of drying faster than the coatings of Comparative Examples A-C.

The coatings of Example 1 and Comparative Examples A-C were also tested for abrasion resistance pursuant to ASTM D4060-01, and were run on double coated lacquer charts (Form 8B from Leneta Company, Inc., Mahwah, N.J.). Coupons were cut from each chart and conditioned to constant weight in a dessicator. Each coupon was then weighed before and after the abrasion test cycles to determine the amount of material lost due to abrasion. The coating of Example 1 exhibited a loss of 25 milligrams (mg), the coatings of Comparative Examples A and C each exhibited losses of 13 milligrams, and the coating of Comparative Example B exhibited a loss of 19 milligrams. While the coating of Example 1 exhibited a greater loss compared to the coatings of Comparative Examples A-C, the coatings of Comparative Examples A-C are commercially recognized for their good abrasion resistances. Accordingly, all of the tested coatings exhibited low amounts of material loss, which corresponded to good abrasion resistances.

The coatings of Example 1 and Comparative Example C were also tested for impact resistance, heel marking, and scratch resistance. The impact resistance test was performed pursuant to ASTM D2794-93, and was run on double-coated maple flooring coated to about 38 dry micrometers (about 1.5 dry mils) to about 51 dry micrometers (about 2.0 dry mils). The impact force applied was 14 kilogram-centimeters (12 pound-inches), and the impact area was then evaluated under magnification for cracking or delamination. After the test, each coating was substantially free of cracking or delamination, thereby illustrating the good impact resistances of the coatings.

The heel marking test was performed on double-coated maple flooring coated to about 38 dry micrometers (about 1.5 dry mils) to about 51 dry micrometers (about 2.0 dry mils). A rubber heel was rub across the coated flooring at about a 45E angle until the rubber heel exhibited observable wear. The coated flooring were then wiped clean and visually examined for damage to the coatings. Upon examination, neither coating exhibited visual damage.

The scratch resistance test was performed pursuant to ASTM 5178-98, and each coating passed an application of 800 grams. Accordingly, the coating of Example 1 also exhibited similar physical resistances to the coating of Comparative Example C, which is also commercially recognized for its good physical properties. In addition, the coating of Example 1 was prepared from the PU polymer dispersion, which contained a low concentration of VOCs.

The coatings of Example 1 and Comparative Example C were also tested for chemical resistance by exposing each coating to different chemical substances. For each coating, two coatings of the material were applied onto a black vinyl chart (Leneta Co. Form P121-10N) to obtain a film thickness of about 1.5 to 2.0 dry mils. Spots of each chemical substance were then applied to each chart and covered with a watch glass for two hours. The chemical substances applied included a 20% aqueous vinegar solution, an 80% aqueous isopropanol solution, a hand lotion ("Suave Skin Therapy with Vitamin E and Lanolin" from Unilever United States, Inc., Englewood Cliffs, N.J.), a suntan lotion ("Banana Boat SunLotion with Aloe" from Sun Pharmaceuticals Corporation, Westport, Conn.), and a shower cleaner ("Arm and Hammer Clean Shower" from Church & Dwight Co., Inc., Princeton, N.J.).

The glasses were then removed, and applied chemical substances were removed with a soft, clean cloth. The films were then examined for softening, swelling, color, and any change in appearance. The films were then rinsed with clean water, allowed to dry overnight, and re-evaluated for the same changes. Upon examination, the 20% aqueous vinegar solution, the hand lotion, the suntan location, and the shower cleaner did not cause any noticeable effects on either coating. With respect to the 80% aqueous isopropanol solution, each coating was initially softened, but recovered after allowing to dry overnight. Accordingly, the coatings exhibited good chemical resistances to the applied chemical substances.

Although the present invention has been described with reference to preferred embodiments, workers skilled in the art will recognize that changes may be made in form and detail without departing from the spirit and scope of the invention.

The invention claimed is:

1. A water-dispersible polyurethane polymer comprising:
a plurality of urethane linkages;
a plurality of cycloaliphatic groups derived from cycloaliphatic diacids;
a plurality of salt or salt-forming groups; and
a plurality of air-curable ethylenically unsaturated groups, wherein a combined concentration of the plurality of cycloaliphatic groups and the plurality of air-curable ethylenically unsaturated groups constitutes at least about 30 percent by weight of the polyurethane polymer, based on a total dry weight of the polyurethane polymer, and at least 20 percent by weight of the plurality of cycloaliphatic groups and the plurality of air-curable ethylenically unsaturated groups are provided by alkyd-based polyols,
wherein the polyurethane is dispersible in water without requiring the use of a separate surfactant.

2. The polyurethane polymer of claim 1, wherein at least one of the plurality of cycloaliphatic groups comprises a structure X—Z—X, and wherein:

Z is an aliphatic ring structure;
each X is a group independently selected from an ester group, an ether group, an amide group, a carbonate group, hydrogen, or CRn, where R is independently selected from hydrogen, a halogen, oxygen, nitrogen, an organic group, or a combination thereof and n is 0, 1 or 2; and
at least one of the X groups is a divalent linkage group that attaches the at least one cycloaliphatic group to another portion of the polyurethane polymer.

3. The polyurethane polymer of claim 2, wherein Z comprises a divalent aliphatic ring structure and the X groups comprise divalent linkage groups that attach the at least one cycloaliphatic group to other portions of the polymer.

4. The polyurethane polymer of claim 1, wherein the plurality of cycloaliphatic groups are located on a backbone of the polyurethane polymer.

5. The polyurethane polymer of claim 1, wherein the plurality of cycloaliphatic groups constitute at least about 4 percent by weight of the polyurethane polymer, based on the total dry weight of the polyurethane polymer.

6. The polyurethane polymer of claim 1, wherein the plurality of air-curable ethylenically unsaturated groups constitute at least about 15 percent by weight of the polyurethane polymer, based on the total dry weight of the polyurethane polymer.

7. The polyurethane polymer of claim 1, wherein a ratio of the plurality of urethane linkages to the plurality of cycloaliphatic groups in the polyurethane polymer includes less than about 8:1.

* * * * *